United States Patent
Garcia et al.

(10) Patent No.: US 10,923,918 B2
(45) Date of Patent: Feb. 16, 2021

(54) CONTROL OF REACTIVE POWER IN A WIND POWER PLANT

(71) Applicant: VESTAS WIND SYSTEMS A/S, Aarhus N (DK)

(72) Inventors: Jorge Martinez Garcia, Aarhus N (DK); Rasmus Lærke, Viby J (DK); Henrik B. Møller, Egå (DK); Kouroush Nayebi, Ikast (DK); Athanasios Rokofyllos, Aarhus (DK); Mu Wei, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 220 days.

(21) Appl. No.: 15/039,514

(22) PCT Filed: Nov. 4, 2014

(86) PCT No.: PCT/DK2014/050361
§ 371 (c)(1),
(2) Date: May 26, 2016

(87) PCT Pub. No.: WO2015/078472
PCT Pub. Date: Jun. 4, 2015

(65) Prior Publication Data
US 2017/0025859 A1    Jan. 26, 2017

(30) Foreign Application Priority Data
Nov. 28, 2013   (DK) .......................... PA 2013 70726

(51) Int. Cl.
*H02J 3/38* (2006.01)
*H02J 3/16* (2006.01)
(Continued)

(52) U.S. Cl.
CPC ............ *H02J 3/386* (2013.01); *F03D 7/0284* (2013.01); *F03D 7/048* (2013.01); *H02J 3/16* (2013.01);
(Continued)

(58) Field of Classification Search
None
See application file for complete search history.

(56) References Cited

U.S. PATENT DOCUMENTS

2010/0025994 A1* 2/2010 Cardinal ............... F03D 7/0284
                                                      290/44
2012/0029723 A1    2/2012 Schugart et al.

FOREIGN PATENT DOCUMENTS

EP          2610487 A1    7/2013
WO    2012/015507 A1    2/2012
(Continued)

OTHER PUBLICATIONS

Danish Search Report for PA 2013 70726, dated Jun. 12, 2014.
International Search Report for PCT/DK2014/050361, dated Mar. 12, 2015.

*Primary Examiner* — Mohammad Ali
*Assistant Examiner* — Saad M Kabir
(74) *Attorney, Agent, or Firm* — Patterson + Sheridan, LLP

(57) ABSTRACT

The invention relates to a method for controlling injection and absorption of reactive power in a wind power plant (WPP). In addition to wind turbine generators (WTG), the wind power plant comprises reactive power regulating devices, such as MSU and STATCOM devices. The reactive power regulating devices are controlled by wind power plant controller so that the combined amount of reactive power produced by the wind turbine generators and the reactive power regulating devices satisfies a desired amount of reactive power. In case of communication fault between the (Continued)

power plant controller and one of the reactive power regulating devices, the power plant controller is reconfigured so as to compensate the capability of the reactive power regulating device to inject or absorb the amount of reactive power.

11 Claims, 2 Drawing Sheets

(51) Int. Cl.
     *F03D 7/02*           (2006.01)
     *F03D 7/04*           (2006.01)
     *H02J 3/46*           (2006.01)
     *H02J 3/18*           (2006.01)

(52) U.S. Cl.
     CPC ............. *H02J 3/46* (2013.01); *F05B 2240/96* (2013.01); *H02J 3/1842* (2013.01); *Y02E 10/72* (2013.01); *Y02E 10/76* (2013.01); *Y02E 40/10* (2013.01); *Y02E 40/20* (2013.01); *Y02E 40/30* (2013.01)

(56) References Cited

FOREIGN PATENT DOCUMENTS

| | | |
|---|---|---|
| WO | 2012/016585 A1 | 2/2012 |
| WO | 2012/130244 A2 | 10/2012 |
| WO | 2012/139657 A2 | 10/2012 |

\* cited by examiner

CONTROL OF REACTIVE POWER IN A WIND POWER PLANT

FIELD OF THE INVENTION

The invention relates to a method for controlling production of reactive power in a wind power plant, particularly for controlling one or more wind turbine generators and one or more reactive power regulating devices for producing a desired amount of active or reactive power. Further, the invention relates to a power plant controller, and to a wind power plant comprising a power plant controller.

BACKGROUND OF THE INVENTION

A wind power plant (WPP) comprises one or more wind turbine generators (WTG) and possibly one or more reactive power regulating devices connected to power connection line which is connected to an electrical grid. The wind turbine generators and reactive power regulating devices are capable of injecting and absorbing reactive power to/from the electric grid via the power connection line.

The injecting or absorbing of reactive power by the reactive power regulating devices is controlled by a power plant controller based on a setpoint defining a desired amount of reactive power to be supplied to the electrical grid.

EP2610487 discloses a method for controlling a wind turbine connected to a utility grid where the method comprises: detecting whether control data from a central controller are receivable, wherein the central controller is provided for controlling the wind turbine and a plurality of other wind turbines; if it is detected that control data from the central controller are receivable, receiving the control data from the central controller; if it is detected that control data from the central controller are not receivable, receiving the control data from a local controller of the wind turbine; and controlling the wind turbine based on the received control data.

SUMMARY OF THE INVENTION

The inventors of the present invention have found that if the communication between a reactive power regulating device and the power plant controller fails, it becomes difficult to ensure that the desired amount of reactive power is supplied to the electrical grid. Accordingly, it is an objective to maintain control of the produced amount of reactive power in case of a lost communication between a reactive power regulating device and the power plant controller.

Due to this objective and problems of known solutions, the inventors of the present invention have appreciated that improvements would be of benefit, and has in consequence devised the present invention.

It would be advantageous to achieve improved methods for controlling wind turbine generators. In particular, it may be seen as an object of the present invention to provide a method that solves the above mentioned problems relating to communication faults between one or more reactive power regulating devices and a power plant controller in a wind power plant, or that solves other problems, of the prior art.

To better address one or more of these concerns, in a first aspect of the invention a power plant controller for generating a setpoint to a wind turbine generator connected to an electrical grid is presented, wherein the setpoint relates to a desired amount of reactive power to be produced by the wind turbine generator, wherein the power plant controller comprises a device controller configured to control operation of a reactive power regulating device, wherein the reactive power regulating device is capable of injecting or absorbing an amount of reactive power to/from the electrical grid, a reference control system configured to determine the setpoint on basis of an electrical reference input and a measured electrical value, a communication fault detector configured to detect a communication fault between the power plant controller and the reactive power regulating device, wherein the power plant controller is arranged to be reconfigured in response to a detection of the communication fault in order to compensate the capability of the reactive power regulating device to inject or absorb the amount of reactive power to/from the electrical grid.

Advantageously, in a situation where a reactive power regulating device is affected by a communication fault and, thereby, being non-controllable, the lost or assumed lost generation of reactive power by the affected device may be compensated by reconfiguring the power plant controller. Accordingly, by means of the possibility of reconfiguring the power plant controller, improved robustness to communication faults may be achieved and, thereby, improved performance of wind power plants.

According to an embodiment the power plant controller is arranged to perform the reconfiguration by stopping the device controller 141, 142 to control operation of the reactive power regulating device 131, 132 in response to the detection of the communication fault.

Advantageously, by stopping the device controller, saturation problems in a possible PI controller comprised by the device controller may be avoided.

According to an embodiment the power plant controller comprises a limit function for limiting the setpoint to a maximum value, wherein the power plant controller is configured to perform the reconfiguration by reducing the maximum value by a value determined from a capacity value of the reactive power regulating device.

Advantageously, by adjusting the maximum value, the setpoint is limited to a value corresponding to the actual reactive power capacity of the wind power plant by taking into account reactive power regulating devices affected by a communication fault.

According to an embodiment the power plant controller is configured to perform the reconfiguration by distributing the setpoint among other reactive power regulating devices not affected by the communication fault and/or wind turbine generators.

Advantageously, by distributing the setpoint among correctly operating reactive power regulating devices and wind turbine generators, the desired reactive power may still be produced even in case that a reactive power regulating device is non-operable.

According to an embodiment the power plant controller is configured to modify the setpoint by a feed-forward modification value, wherein the power plant controller is further configured to perform the reconfiguration by changing the feed-forward modification value by an amount corresponding to the capacity value of the reactive power regulating device or by reducing the feed-forward modification value to zero, in response to the detection of the communication fault.

Advantageously, by changing the feed-forward modification value it may be possible to achieve a fast adaptation of the setpoint so that the setpoint reflects the amount of reactive power to be produced in order produce the desired amount of reactive power.

According to an embodiment the power plant controller is configured to perform the reconfiguration after a time delay after detection of the communication fault.

Advantageously, the time delay may ensure that a reconfiguration is only invoked if the communication fault is persistent or is present for a minimum duration.

According to an embodiment of the power plant controller, in response to a detection of no communication fault, the power plant controller is arranged to perform a configuration back into an original state, wherein the capability of the reactive power regulating device to inject or absorb the amount of reactive power to/from the electrical grid is no longer compensated.

According to an embodiment the power plant controller is configured to configure the reference control system back into an original state after a time delay, in response to a detection of no communication fault.

Advantageously, the time delay may ensure that a configuration back to an original state is only invoked if the re-established communication is persistent.

A second aspect of the invention relates to a wind power plant connectable to an electrical grid, wherein the wind power plant comprises at least one wind turbine generator, and a power plant controller as defined in the first aspect.

A third aspect of the invention relates to a method for generating a setpoint to a wind turbine generator connected to an electrical grid, wherein the method comprises
- controlling operation of a reactive power regulating device, wherein the reactive power regulating device is capable of injecting or absorbing an amount of reactive power to/from the electrical grid,
- determining the setpoint on basis of an electrical reference input and a measured electrical value,
- detecting a communication fault between a power plant controller and the reactive power regulating device, and
- in response to detecting the communication fault, reconfiguring the power plant controller so as to compensate the capability of the reactive power regulating device to inject or absorb the amount of reactive power to/from the grid.

A fourth aspect of the invention relates to at least one computer program product directly loadable into the internal memory of at least one digital computer, comprising software code portions for performing the steps of the third aspect when said at least one product is/are run on said at least one computer.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
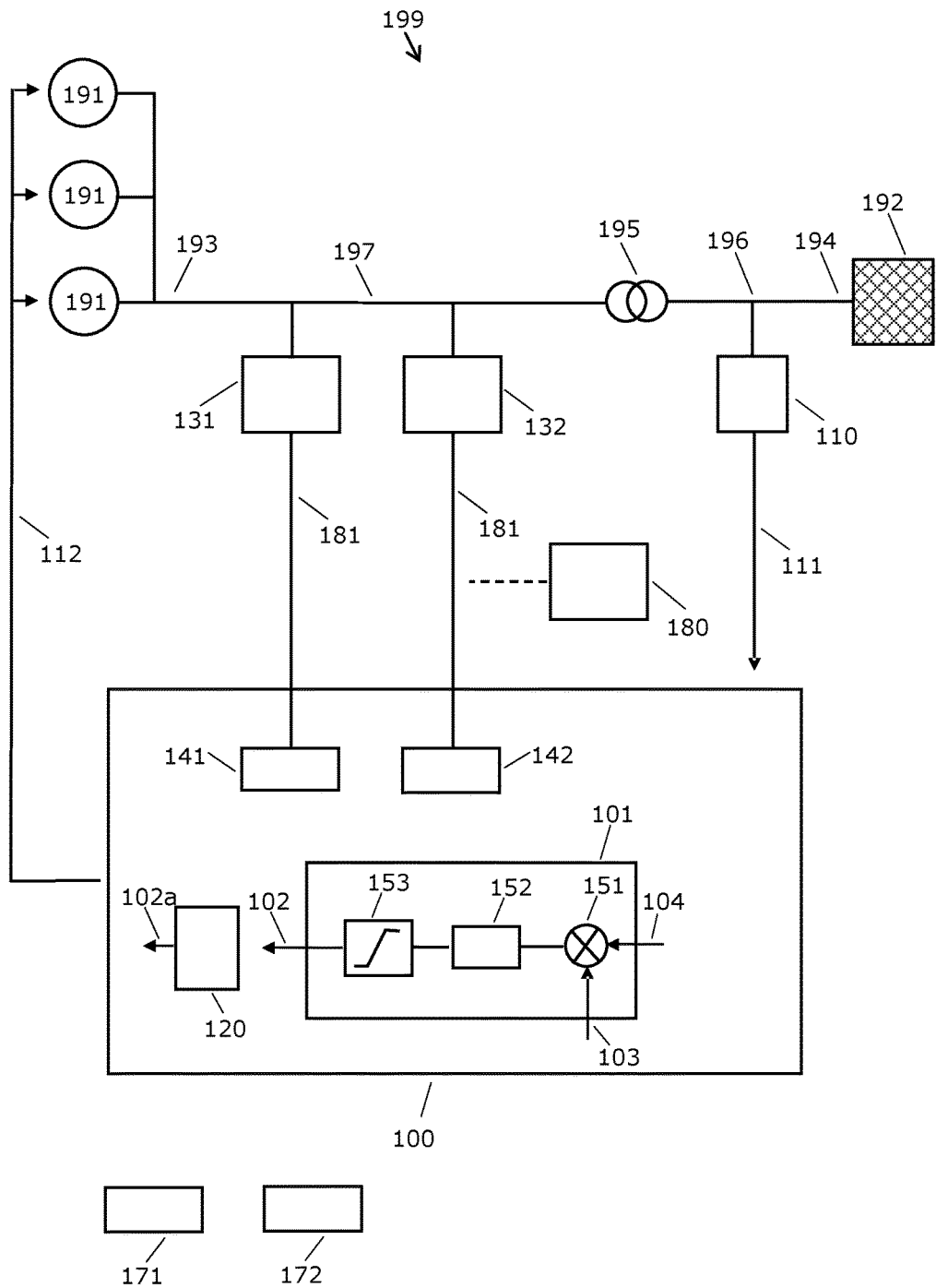
FIG. 1 illustrates a wind power plant 199 comprising a power plant controller 100.

FIG. 1 illustrates a wind power plant 199 comprising a power plant controller 100, one or more wind turbine generators (WTG) 191, one or more reactive power regulating devices 131, 131, a power connection line 197 and other components. Among different functions of the power plant controller, one function is for generating a setpoint to one or more wind turbine generators 191. The setpoint directly or indirectly sets a desired amount of reactive power to be produced by the wind turbine generator. The setpoint may be in the form of a value of a reactive power Q, a voltage U or a quadrature current Iq, where these values are related by $Q=U \cdot Iq$. Other setpoints may relate to a desired amount of active power to be produced. The set point is supplied as input references to a control system of the wind turbine generators which is capable of controlling the wind turbine generator to generate an amount of reactive power corresponding to the setpoint. Accordingly, the wind turbine generators are responsive to change a parameter of produced power in response to a provided set point, i.e. to change the amount of active and/or reactive power injected to the electrical grid 192.

The functionality of the wind turbine generator to change the amount of reactive power supplied to the grid is embodied by a power inverter comprised by the wind turbine generator. Accordingly, the aforementioned control system of the wind turbine generator is configured for controlling the inverter's injection or absorption of active and/or reactive current to/from the grid in response to the setpoint.

One or more wind turbine generators 191 are connected to the electrical grid 192 via a WTG connection point 193 and a power connection line 197. The electrical grid 192 may also be referred to as a grid or utility grid. The grid is connected to the power connection line at a point of common coupling (PCC) 194. Thus, the connection line connects WTG connection point 193 with the point of common coupling (PCC) 194. One or more electrical transformers 195 may be located between the power output of the wind turbine generators 191 and the grid 192, i.e. between the WTG connection point 193 and the PCC, for the purpose of adapting the voltage of the wind turbine's power output to the grid voltage.

The power plant controller 100 comprises a reference control system 101 configured for determining the setpoint 102 on basis of an electrical reference value 103 and a stream of measured electrical grid values 104 communicated from a grid meter 110. The stream of measured electrical grid values 104 may be outputted from the grid meter 110 as an analog or digital signal. The setpoint 102 or pluralities of possibly different setpoints are supplied, possibly distributed, to the one or more wind turbine generators 191, via a connection 112.

A grid sensor located at a point of measurement (POM) 196 measures different electrical parameters, e.g. voltage and current. The grid sensor generally consists of one or more voltage sensors and one or more current sensors. The measured electrical parameters may further be processed by a grid meter 110. For example, the grid meter 110 may determine values of voltage, active and reactive power and frequency on basis of measured voltage and current signals supplied by the grid sensor 195. Accordingly, the electrical parameters at the POM 196 may be indicative of an amount of active or reactive electrical power supplied to the grid via the PCC 194. The values determined by the grid meter 110 are streamed to the reference control system 101 via a connection 111, e.g. a wired digital connection, as measured electrical grid values 104.

The electrical reference value 103 contains reference values of electrical parameters which are desired to be injected into the grid 192, e.g. references of voltage, active power, reactive power and/or frequency that should be present at the PCC 194 or at the POM 196. The electrical reference value(s) 103 may be set by grid codes and possibly provided by a grid operator, a dispatcher centre or wind power plant operator.

Accordingly, the electrical reference value 103 and the measured electrical grid values 104 may comprise voltages, frequency values, and active and reactive power values.

Depending on the configuration of the reference control system 101 the setpoint 102 may be determined on basis of different electrical reference values 103 (e.g. frequency or reactive power) and different measured electrical grid values 104 (e.g. frequency or reactive power). Additionally, in a configuration of the reference control system 101 the setpoint 102 may be determined on basis of two electrical reference values, e.g. voltage and reactive power references. Such configurations of the reference controller 201 are known.

In an example, the power set point 102 is a reactive power set point Qset determined from en electrical grid value 104 being a grid reactive power Qm supplied by the grid meter 110 and an electrical reference value 103 being a grid reference reactive power Aref. A difference of the reactive power values Qm and Qref are determined by subtraction unit 151 and inputted to a PI controller 152. The output from PI controller 151 is processed by a limit function 153 and limited to a maximum Qmax if the output from the PI controller is greater than Qmax. The output from the limit function 153 is the reactive power set point Qset.

The limit Qmax may be determined as the sum of reactive power capacities of the wind turbine generators 191 and other reactive power regulating devices 131,132 connected to the power line 197, i.e. as Qmax=Sum(Q_WTGi)+Sum(Q_MSUi)+Sum(Q_STATCOMi), where Sum is a summation operator performing a sum over i, where Q_WTGi is a reactive power capacity of a single wind turbine generator i, where Q_MSUi is a reactive power capacity of a single MSU i, and where Q_STATCOMi is a reactive power capacity of a single STATCOM i. The MSU and STATCOM are example of reactive power regulating devices and are described below.

Alternatively, since the setpoint may also be expressed as a voltage value or a quadrature current value, the limit function 153 may also be limited to a maximum voltage Umax or maximum quadrature current Iqmax. Thus, in general the limit function 153 may be limited to a maximum value of an electrical parameter Xmax, where Xmax may be maximum reactive power Qmax, a maximum voltage Vmax or a maximum quadrature current Iqmax.

Thus, in general the maximum value of an electrical parameter of the limit function 153 may be determined as the sum values relating to the reactive power capacities of the wind turbine generators 191 and other reactive power regulating devices 131,132 connected to the power line 197, i.e. as Xmax=Sum(X_WTGi)+Sum(X_MSUi)+Sum(X_STATCOMi).

For example, if the setpoint is 102 is expressed in terms of a quadrant current Iq_set, then the output of the PI controller 152 is in terms of a quadrant current so that Iq_set is determined by quadrant current capacities of the wind turbine generators (Iq_WTG), STATCOMs (Iq_StatCOM), MSUs (Iq_MSU) and possible other devices. Iq_*WTG is related to Q=Iq·U, where U is the voltage at the WTG power output, Iq is the current and Q is the reactive power. Thus, due to the relationship between Iq, U and Q values, each of these values can be used as setpoint 102.

Such configurations of the reference controller 101—and other configurations where a setpoint, e.g. a reactive power setpoint Qset, is determined from a measured grid voltage Vm, a corresponding voltage reference Vref and a measured grid reactive power Qm—are known. Other configurations of the reference controller 101 for determining active power set points Pset are also known. See e.g. section 4.2 and FIG. 8 in: "Operation and control of large wind turbines and wind farms—Final report; Florin Iov, Frede Blaabjerg, et. al.; Risø, September 2005, ISSN 0106-2840, ISBN 87-550-3469-1 (Internet)"

The setpoint 102 may be distributed by a dispatcher 120 among the wind turbine generators 191 as, possibly different, distributed setpoints 102*a*. The set point 102 may further be distributed among other reactive power regulating devices 131,132 (see description below). The value of setpoints 102*a* to be distributed may be determined based on reactive power capacities of the different available wind turbine generators and reactive power regulating devices.

The capability of the wind turbine generators 191 to inject or absorb reactive power may not be sufficient to the meet the demand for reactive power at the PCC 194. Therefore, the wind power plant 199 may include one or more reactive power regulating devices 131,132 which are capable of injecting and/or absorbing reactive power. An example of a reactive power regulating device is a static synchronous compensator 131 (STATCOM) which comprises a capacitor capable of absorbing or injecting reactive power from/to the grid 192 via the connection line 197 by means of a DC-AC converter converting DC power to/from the capacitor from/to AC power absorbed/injected from/to the connection line 197. Another example of a reactive power regulating device is a mechanically switched unit 132 (MSU), e.g. a capacitor switched unit connected to the connection line 197 via a mechanical or thyristor-operated switch.

The STATCOM 131 and MSU 132 may be controlled independently from each other by one or more device controllers 141, 142. For example the STATCOM 131 may be controlled by a STATCOM device controller 141, and the MSU 132 may be controlled by a MSU device controller 142. Alternatively, one or more STATCOM's and MUS's may be controlled by a single device controller 141. Alternatively or additionally, a STATCOM 131 may include a MSU.

The STATCOM 131 may be controlled on basis of the setpoint 102, or distributed setpoint 102*a*, e.g. a reactive power set point Qset or a fraction of the reactive power set point Qset as determined by the dispatcher 120. Accordingly, a parameter derived from the reactive power set point Qset may be supplied as an input to the STATCOM controller 141 for controlling the STATCOM to absorb or inject a corresponding amount of reactive power. The MSU 132 may be controlled in a similar way on basis of a value, e.g. an on/off value, derived from the setpoint 102 which is supplied to the MSU controller 142 for connecting or disconnecting the MSU with the power connection line 197. Alternatively, the MSU may be controlled by the STATCOM 131 or STATCOM controller 141.

In order to be able to inject the amount of reactive power according to the setpoint 102 it is important that control or data signals transmitted by a device controller 141, 142 are correctly received by a reactive power regulating device 131,132, alternatively, that control or data signals transmitted by a reactive power regulating device 131,132 are correctly received by a device controller 141, 142. Accordingly, it is important to know if the communication between a device controller 141, 142 and a reactive power regulating device 131,132 is working without faults or is faulty or unreliable. The faulty or unreliable communication status may be due to a communication failure in the connection 181 between the power plant controller 100, e.g. a device controller 141, and a regulating device 131, or due to a failure in a communication part in a device controller 141, in a regulating device 131 or in other systems. The device controller 141, 142 is part of the power plant controller 100 and it is considered that that a communication failure may arise in the communication between the power plant controller 100 and a reactive power regulating device 131, 132.

For the purpose of detecting such communication faults the power plant controller 100 is configured with a communication fault detector 180 configured for detecting a communication fault between the power plant controller 100, e.g. a device controller 141, 142, and the reactive power regulating device 131, 132.

Detection of a communication fault in a connection 181 may be performed using known error detection methods such as parity bit methods, check sum methods or other methods.

In order to avoid that the injected reactive power is controlled in an inappropriate way due to a communication fault the power plant controller 100 may be configured to handle such detected communication faults in different ways generally by reconfiguring the power plant controller 100, e.g. parts of the power plant controller such as the reference controller 101 or connections between parts of the power plant controller, so as to compensate the capability of the reactive power regulating device to inject or absorb the amount of reactive power to/from the grid. I.e. the power plant controller 100 is reconfigured so that the reactive power demand determined directly or indirectly by the output value from the reference controller 101 as the setpoint 102, possibly limited by the limit function 152, is still absorbed or injected by the wind turbine generators 191 in spite of the faulty communication to or from the reactive power regulating device 131, 132.

Figure 2:
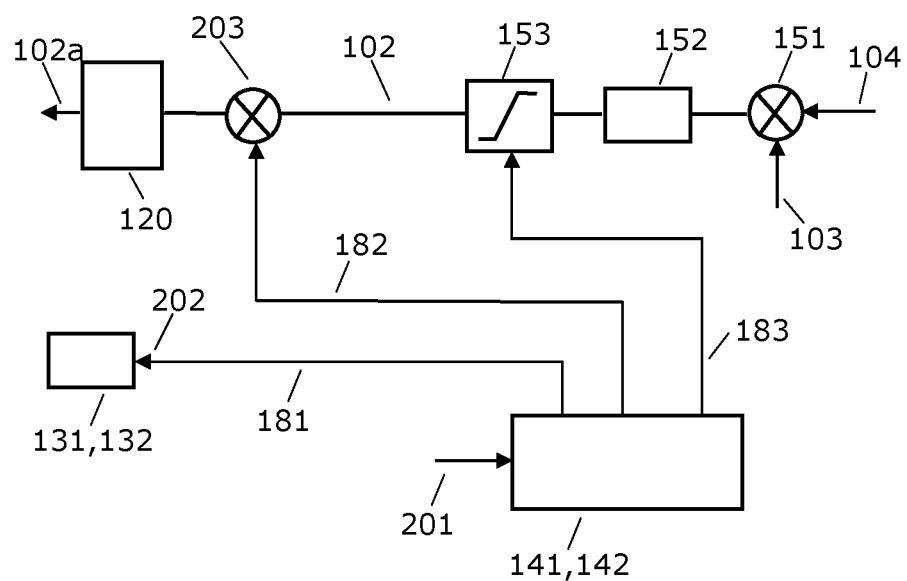
FIG. 2 illustrates details shows details of a device controller 141, 142 comprised by the power plant controller.

FIG. 2 shows details of a device controller 141, 142, and the reactive power regulating device 131, 132. Some components in FIG. 2 have already been described in connection with FIG. 1 and are, therefore, not described here except for additional functionalities.

The device controller 141 may be a controller dedicated for controlling operation of a MSU, a STATCOM, other reactive power regulating devices 131, 132 or combinations of these, i.e. controlling such one or more devices to absorb or inject a given amount of reactive power. The device controller 141 may be configured with an input for receiving one or more control inputs 201, for example a feedback signal from an MSU or a reactive power control signal (e.g. a fraction of the reactive power setpoint 102). The device controller 141 is configured for determining a control output 202 to one or more reactive power regulating devices 131, 132 (transmitted via connection 181) based on the inputs 201. For example, a control output 202 may be in the form of an on/off signal for controlling a MSU or a reactive power reference for controlling a STATCOM, wherein the active power reference for controlling a STATCOM may be determined as a fraction of the setpoint 102, e.g. by the dispatcher 120 or the device controller 141.

For example, if the reference 103 increases beyond the measured input 104 by a value equal to or greater than a capacity value of a MSU 132, e.g. a value of 5 MVAr, then the device controller 141 may decide if a control output 202 should be sent to a MSU for connecting the MSU to the power connection line 197.

In an embodiment reconfiguring the power plant controller 100 in response to detection of a communication fault comprises stopping the device controller 141, 142 to control operation of the reactive power regulating device. Stopping the device controller may involve freezing the control output 202, i.e. setting the control output equal to a constant value as was determined before detection of the communication fault. Alternatively, stopping the device controller may involve setting the control output 202 to a predetermined value, e.g. setting the on/off signal to an MSU to a predetermined off.

Freezing the control output 202 may have the advantage that wind-up problems in e.g. the PI controller 152 are avoided. Assuming that the control output 202—in the form of a reactive power reference to a STATCOM—was not freezed in response to a communication fault. Further assume that the capability of the one or more WTGs is 1 MVAr, the capability of the affected STATCOM is 1 MVAr and that the reference 103 is 1.2 MVAr. In this situation the control input to the STATCOM may be a value corresponding to 0 MVAr. In response to a communication fault the affected STATCOM does not produce reactive power any more. Accordingly, the one or more WTGs produce their maximum of 1 MVAr. Since the reference of 1.2 MVAr remains higher than the measured grid value 104 which can only increase to 1 MVAr, the setpoint 102 increases to a limit of 2 MVAr which is the nominal capacity when no communication faults are present. This causes an increase of the control output 202 to a value corresponding to 2 MVAr (the control output 202 is saturated to its maximum value), i.e. substantially higher than the value before the communication fault. At some point in time the communication with the STATCOM is re-established. Since the control input 202 has increased to 1 MVAr during the loss of communication, the STATCOM device controller 141 will react by controlling the STATCOM 131 according to the new reference, which may cause the STATCOM to produce an overshot of reactive power (e.g. 2 MVAr), i.e. by producing an amount of reactive power which is significantly higher than the demand. Accordingly, if the control output 202 had been freezed, e.g. to the original value present before the loss of communication, the large overshot in produced reactive power may have been avoided.

In an embodiment reconfiguring the power plant controller 100 in response to detection of a communication fault comprises reducing the maximum value of an electrical parameter of the limit function 153 by a capacity value of the reactive power regulating device 131, 132 or by a value determined from or related to a capacity value of the reactive power regulating device affected by a communication fault. For example, if a communication fault in a communication with an MSU is detected, Qmax may be reduced by Q_MSUi—the reactive power capacity of MSUi.

The device controller 141, 142 may be configured to change the limits (i.e. the maximum value) of the limit function 153, e.g. in response to detection of a communication fault, via connection 183. Alternatively, other functions of the power plant controller 100, e.g. the fault detector 180, may be configured to change the limits of the limit function 153 in response to detection of a communication fault.

The adaptation of the limit function 153 ensures that the desired reactive power as expressed by the setpoint 102 does not exceed the available reactive power compensation capacity of the wind turbine generators 191 and reactive power regulating devices 131, 132. Thus, in case of a communication fault the reactive power regulating device 131, 132 affected by the communication fault is assumed to have a reactive power compensation capacity of zero. In practice the affected power regulating device 131, 132 may continue to inject or absorb reactive power due to the lost communication, but the reactive power reference set by the reactive power set point is still controlled due to the closed control loop.

In an embodiment reconfiguring the power plant controller 100 in response to detection of a communication fault comprises distributing, i.e. redistributing, the setpoint 102 or setpoints 102a among reactive power regulating devices 131, 132 which are not affected by a communication fault and/or among wind turbine generators, i.e. so that the faulty power regulating device is excluded in the wind power plant 199 as a controllable power regulating device. This may be affected by setting a capacity value of the affected reactive power regulating device to zero, and distributing the setpoint among other remaining reactive power regulating devices (with no faults) and/or wind turbine generators.

The redistribution of the setpoint 102 may only be effected when a new difference between the electrical reference input 103 and a measured electrical value 104 has been determined by the subtraction unit 151 at a point in time after the detection of the communication fault. That is, to ensure that the possibly unknown reactive power injected or absorbed by the affected power regulating device 131 (which is assumed non-controllable) is reflected by the newly calculated error between the measured input 104 and the reference input 103.

For example, in case of a communication fault associated with one or more of the MSUs and Statcoms, a Qset setpoint is re-distributed among the remaining MSUs, Statcoms and WTGs when a difference between the electrical reference input 103 (e.g. Qref) and a measured electrical value 104 (e.g. Qmeasured) has been determined after the occurrence of the communication fault.

The power plant controller 100, e.g. the device controller 141, may be configured to determine a feed-forward modification value to be subtracted from (or added to) the setpoint 102 via subtraction unit 203. The feed-forward modification value is forwarded via connection 182. The feed-forward modification value may be determined from knowledge about how the reactive power regulating device 131, 132 will be controlled in future time. Accordingly, if a power regulating device 131, 132 is affected by a detected communication fault, the knowledge about a non-controllable power regulating device 131, 132 may be used to instantaneously change the feed-forward modification value.

For example, in the example where the device controller 141 decided that a control output 202 should be sent to a MSU for connecting the MSU to the power connection line 197—in a situation where the reference 103 increases beyond the measured input 104 by a value equal to a capacity value of a MSU 132—the sudden capacity introduced by the MSU may be compensated by forwarding a feed-forward modification value corresponding to the capacity of the MSU. Thus, if the MSU has a capacity of 5 MVAr, the sudden connection of the MSU to the connection line 197, may be compensated by forwarding a feed-forward modification value equal to 5 MVAr or corresponding to 5 MVAr.

In case of a communication fault where the communication with the MSU is lost, it may be assumed that the MSU does not contribute with its reactive power capacity and, therefore, the feed-forward modification value may be set to zero or gradually reduced to zero or reduced by a value corresponding to the capacity of the MSU 132. The change of the feed-forward modification value may be performed with a time response that is slower than the time response of other reactive power regulating device 131, 132 connected to the connection line 197 in order to avoid unnecessary transients.

Accordingly, when it is known that a communication link is broken, i.e. when a communication fault is detected, feed-forward compensation can be performed instead of waiting for the power plant controller 100 to react through a measured electrical value 104 being changed in response to a communication fault, e.g. a reactive power regulating device being disabled in response to a communication fault.

Accordingly, the power plant controller, e.g. the device controller 141, may be arranged to reconfigure the power plant controller 100 by determining or changing the feed-forward modification value and to change the setpoint 102 by a value given by, e.g. equal to, a feed-forward modification value, wherein the feed-forward modification value is changed by an amount corresponding to the capacity value of the reactive power regulating device or is reduced to zero, in response to the detection of the communication fault. Changing the modification value may involve ramping down the feed-forward value, e.g. to zero, at a suitable rate, e.g. with a bandwidth which is lower the bandwidth of the PI controller 152 or at a time response as defined above.

The functionality of the power plant controller 100 for reconfiguring the reference control system 101 may be embodied by a reconfiguration unit 171 (FIG. 1) configured to perform the described reconfigurations or other functionality implemented in the power plant controller. In general the power plant controller, or a function thereof, is arranged to perform the described reconfigurations, and/or combinations thereof. Accordingly, in order to be able to reconfigure the power plant controller, or parts or functions thereof, the power plant controller may be arranged in a configurable way so that the power plant controller or parts thereof can be reconfigured in case of a communication fault. For example, the power plant controller may be arranged with connections between components that can be changed, with functions that the modified in response to a request, and other functionalities that can be set to work in different states.

It may be beneficial to insert a delay between a first detection of a communication fault and starting a reconfiguration in order to avoid reconfigurations in cases where the communication fault is only present for a very short time. For that purpose the power plant controller is configured to perform the reconfiguration after a time delay after detection of the communication fault. The time delay may be set by a timer 172 comprised by the power plant controller as shown in FIG. 1.

At some point in time when the communication fault is corrected, i.e. when no communication fault is detected anymore, the power plant controller is configured to configure the power plant controller 100, e.g. limit functions 152, feed-forward compensations, and states of reactive power regulation devices 131, 132 back into an original state present before the detection of the communication fault. A time delay may be inserted between the time of detection of "no communication fault" and configuration of the power plant controller 100 back into its original state. Accordingly, the power plant controller may be configured to perform the configuration back into the original state after a time delay, in response to a detection of no communication fault.

The different reconfiguration possibilities may be combined in the power plant controller 100. Also, depending on a given status of the power plant controller 100, some reconfiguration possibilities may be more suitable than others. Accordingly, different reconfiguration combinations may be applied depending on a given status of the power plant controller.

A method for generating a setpoint 102 to a wind turbine generator 191 connected to an electrical grid 192 may comprise one or more of the following steps in arbitrary order:

1) controlling operation of the reactive power regulating device 131, 132 by use of the device controller 141, 142, 2) determining the setpoint on basis of the electrical reference input 103 and the measured electrical value 104 by use of the reference control system 101, 3) detecting a communication fault between the power plant controller and the reactive power regulating device by use of the communication fault detector 180, and 4) in response to detecting the communication fault, reconfiguring the power plant controller so as to compensate the capability of the reactive power regulating device to inject or absorb the amount of reactive power to/from the grid, wherein the reconfiguration is performed by a function in power plant controller, e.g. the reconfiguration function 171.

The power plant controller 100 or parts of the power plant controller such as one or more of the device controller 141, 142, the reference control system 101, and the communication fault detector 180, or parts of these units may be implanted as computer program products, as electric analogue or digital circuits, or a as combination thereof. A computer program being loadable into the internal memory of at least one digital computer is executable by the computer, wherein execution/running of the program results in functions of the power plant controller 100 being carried out, or in that the steps of a method of an embodiment of the invention are performed.

In summary the invention relates to a method for controlling injection and absorption of reactive power in a wind power plant (WPP). In addition to wind turbine generators (WTG), the wind power plant comprises reactive power regulating devices, such as MSU and STATCOM devices. The reactive power regulating devices are controlled by wind power plant controller so that the combined amount of reactive power produced by the wind turbine generators and the reactive power regulating devices satisfies a desired amount of reactive power. In case of communication fault between the power plant controller and one of the reactive power regulating devices, the power plant controller is reconfigured so as to compensate the capability of the reactive power regulating device to inject or absorb the amount of reactive power.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A power plant controller for generating a setpoint to a wind turbine generator connected to an electrical grid, wherein the setpoint relates to a desired amount of reactive power to be produced by the wind turbine generator, wherein the power plant controller comprises:
    a device controller configured to control operation of a reactive power regulating device on a power line between the wind turbine generator and the electrical grid, wherein the reactive power regulating device is configured to inject or absorb an amount of reactive power to or from the electrical grid via the power line,
    a reference control system configured to determine the setpoint on basis of an electrical reference input and a measured electrical value, and
    a communication fault detector configured to detect a communication fault between the power plant controller and the reactive power regulating device on the power line, wherein the communication fault indicates communication between the device controller and the reactive power regulating device has failed and the reactive power regulating device is no longer controllable by the power plant controller, wherein
    the power plant controller is arranged to be reconfigured in response to (i) a detection of the communication fault and (ii) a detection of a difference between the electrical reference input and a second measured electrical value measured at a time after the detection of the communication fault, wherein the reconfigured power plant controller compensates for a capability of the reactive power regulating device to inject or absorb the amount of reactive power to or from the electrical grid.

2. A power plant controller according to claim 1, wherein the power plant controller is arranged to perform the reconfiguration by stopping the device controller to control operation of the reactive power regulating device in response to the detection of the communication fault.

3. A power plant controller according to claim 1, wherein the power plant controller comprises a limit function for limiting the setpoint to a maximum value, and wherein the power plant controller is arranged to perform the reconfiguration by reducing the maximum value by a value determined from a capacity value of the reactive power regulating device.

4. A power plant controller according to claim 1, wherein the power plant controller is configured to perform the reconfiguration by distributing the setpoint among other reactive power regulating devices not affected by the communication fault and wind turbine generators.

5. A power plant controller according to claim 1, wherein the power plant controller is configured to modify the setpoint by a feed-forward modification value, and wherein the power plant controller is further arranged to perform the reconfiguration by changing the feed-forward modification value by an amount corresponding to a capacity value of the reactive power regulating device or by reducing the feed-forward modification value to zero, in response to the detection of the communication fault.

6. A power plant controller according to claim 1, wherein the power plant controller is arranged to perform the reconfiguration after a time delay after detection of the communication fault.

7. A power plant controller according to claim 1, wherein, in response to a detection of no communication fault, the power plant controller is arranged to perform a configuration back into an original state, wherein the capability of the reactive power regulating device to inject or absorb the amount of reactive power to or from the electrical grid is no longer compensated.

8. A power plant controller according to claim 7, wherein the power plant controller is arranged to perform the configuration back into the original state after a time delay, in response to a detection of no communication fault.

9. A wind power plant connectable to an electrical grid, wherein the wind power plant comprises at least one wind turbine generator, and the power plant controller according to claim 1.

10. A method for generating a setpoint to a wind turbine generator connected to an electrical grid, wherein the method comprises:
controlling operation of a reactive power regulating device on a power line between the wind turbine generator and the electrical grid, wherein the reactive power regulating device is configured to inject or absorb an amount of reactive power to or from the electrical grid via the power line,
determining the setpoint on basis of an electrical reference input and a measured electrical value,
detecting a communication fault between a power plant controller and the reactive power regulating device on the power line, wherein the communication fault indicates communication between the power plant controller and the reactive power regulating device has failed and the reactive power regulating device is no longer controllable by the power plant controller,
after the detection of the communication fault, detecting a difference between the electrical reference input and a second measure electrical value, and
in response to detecting the communication fault and the difference between the electrical reference input and a second measure electrical value, reconfiguring the power plant controller so as to compensate for a capability of the reactive power regulating device to inject or absorb the amount of reactive power to or from the electrical grid.

11. At least one computer program product directly loadable into an internal memory of at least one digital computer, comprising software code portions for performing an operation for generating a setpoint to a wind turbine generator connected to an electrical grid when said at least one product is run on said at least one digital computer, the operation comprising:
controlling operation of a reactive power regulating device, wherein the reactive power regulating device on a power line between the wind turbine generator and the electrical grid is configured to inject or absorb an amount of reactive power to or from the electrical grid via the power line,
determining the setpoint on basis of an electrical reference input and a measured electrical value, wherein the setpoint relates to a desired amount of reactive power to be produced by the wind turbine generator
detecting a communication fault between a power plant controller and the reactive power regulating device on the power line, wherein the communication fault indicates communication between the power plant controller and the reactive power regulating device has failed and the reactive power regulating device is no longer controllable by the power plant controller,
after the detection of the communication fault, detecting a difference between the electrical reference input and a second measure electrical value, and
in response to detecting the communication fault and the difference between the electrical reference input and a second measure electrical value, reconfiguring the power plant controller so as to compensate for a capability of the reactive power regulating device to inject or absorb the amount of reactive power to or from the electrical grid.

\* \* \* \* \*